US012142884B2

(12) United States Patent
Kanas et al.

(10) Patent No.: US 12,142,884 B2
(45) Date of Patent: Nov. 12, 2024

(54) ELECTRONIC DEVICE CONNECTION PORTS

(71) Applicant: Hewlett-Packard Development Company, L.P., Spring, TX (US)

(72) Inventors: Derek Kyle Joseph Kanas, Spring, TX (US); Tony Seokhwa Moon, Spring, TX (US); Andrew Shane Elsey, Spring, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 418 days.

(21) Appl. No.: 17/778,303

(22) PCT Filed: Nov. 21, 2019

(86) PCT No.: PCT/US2019/062653
§ 371 (c)(1),
(2) Date: May 19, 2022

(87) PCT Pub. No.: WO2021/101553
PCT Pub. Date: May 27, 2021

(65) Prior Publication Data

US 2023/0021406 A1 Jan. 26, 2023

(51) Int. Cl.

| | |
|---|---|
| ***H01R 27/00*** | (2006.01) |
| ***H01R 13/24*** | (2006.01) |
| ***H01R 13/62*** | (2006.01) |
| ***H01R 24/60*** | (2011.01) |
| *H01R 105/00* | (2006.01) |

(52) U.S. Cl.
CPC ............ *H01R 27/00* (2013.01); *H01R 13/24* (2013.01); *H01R 13/6205* (2013.01); *H01R 24/60* (2013.01); *H01R 2105/00* (2013.01)

(58) Field of Classification Search
CPC .... H01R 27/00; H01R 13/24; H01R 13/6205; H01R 24/60; H01R 2105/00; H01R 2107/00; H01R 12/714; H01R 13/22
See application file for complete search history.

(56) References Cited

U.S. PATENT DOCUMENTS

| | | | |
|---|---|---|---|
| 8,237,414 | B1 | 8/2012 | Li et al. |
| 8,799,527 | B2 | 8/2014 | Mullins et al. |

(Continued)

FOREIGN PATENT DOCUMENTS

| | | | | |
|---|---|---|---|---|
| CN | 101364694 A | * | 2/2009 | ........... H01R 12/712 |
| CN | 101425653 A | * | 5/2009 | ......... H01R 12/7023 |

(Continued)

*Primary Examiner* — Travis S Chambers
(74) *Attorney, Agent, or Firm* — Knobbe, Martens, Olson & Bear, LLP

(57) ABSTRACT

Example connection ports for electronic devices are disclosed. In an example, the connection port includes a longitudinal axis, a receptacle that extends axially with respect to the longitudinal axis, and a substrate disposed within the receptacle. The substrate includes an end and a support surface that extends axially with respect to the longitudinal axis. In addition, the connection port includes a plurality of first electrical contacts on the support surface, a plurality of second electrical contacts on the end. Each second electrical contact is electrically coupled to a corresponding one of the first electrical contacts.

15 Claims, 10 Drawing Sheets

(56) References Cited

U.S. PATENT DOCUMENTS

| | | | |
|---|---|---|---|
| 9,483,077 | B2 | 11/2016 | Thompson et al. |
| 9,991,628 | B2 | 6/2018 | Daoura |
| 10,090,618 | B2 | 10/2018 | Rohrbach et al. |
| 10,127,181 | B2 | 11/2018 | Ghosh et al. |
| 10,333,249 | B1 | 6/2019 | Wang |
| 2007/0072443 | A1 | 3/2007 | Rohrbach et al. |
| 2015/0081944 | A1 | 3/2015 | An |
| 2015/0244105 | A1 * | 8/2015 | Peng .................. H01R 13/6205 439/39 |

FOREIGN PATENT DOCUMENTS

| | | | | |
|---|---|---|---|---|
| CN | 204045790 | U * | 12/2014 | ............. H01R 24/60 |
| CN | 104836044 | A * | 8/2015 | ......... H01R 13/6315 |
| WO | 2008/065659 | A2 | 6/2008 | |

* cited by examiner

ELECTRONIC DEVICE CONNECTION PORTS

BACKGROUND

Electronic devices (e.g., laptop computers, desk top computers, tablet computers, smart phones, etc.) include connection ports for engaging with corresponding connection plugs disposed on or, coupled to other devices or accessories (e.g., printers, projectors, portable memory devices, power sources and adapters, etc.). In some cases, the ports on a given electronic device may be shaped and sized to correspond with a particular type or design of plug. As a result, electronic devices may include a plurality of different port types so as to allow connection with a multitude of different plug types and devices during operations.

BRIEF DESCRIPTION OF THE DRAWINGS

Various examples will be described below referring to the following figures.

DETAILED DESCRIPTION

Figure 1:
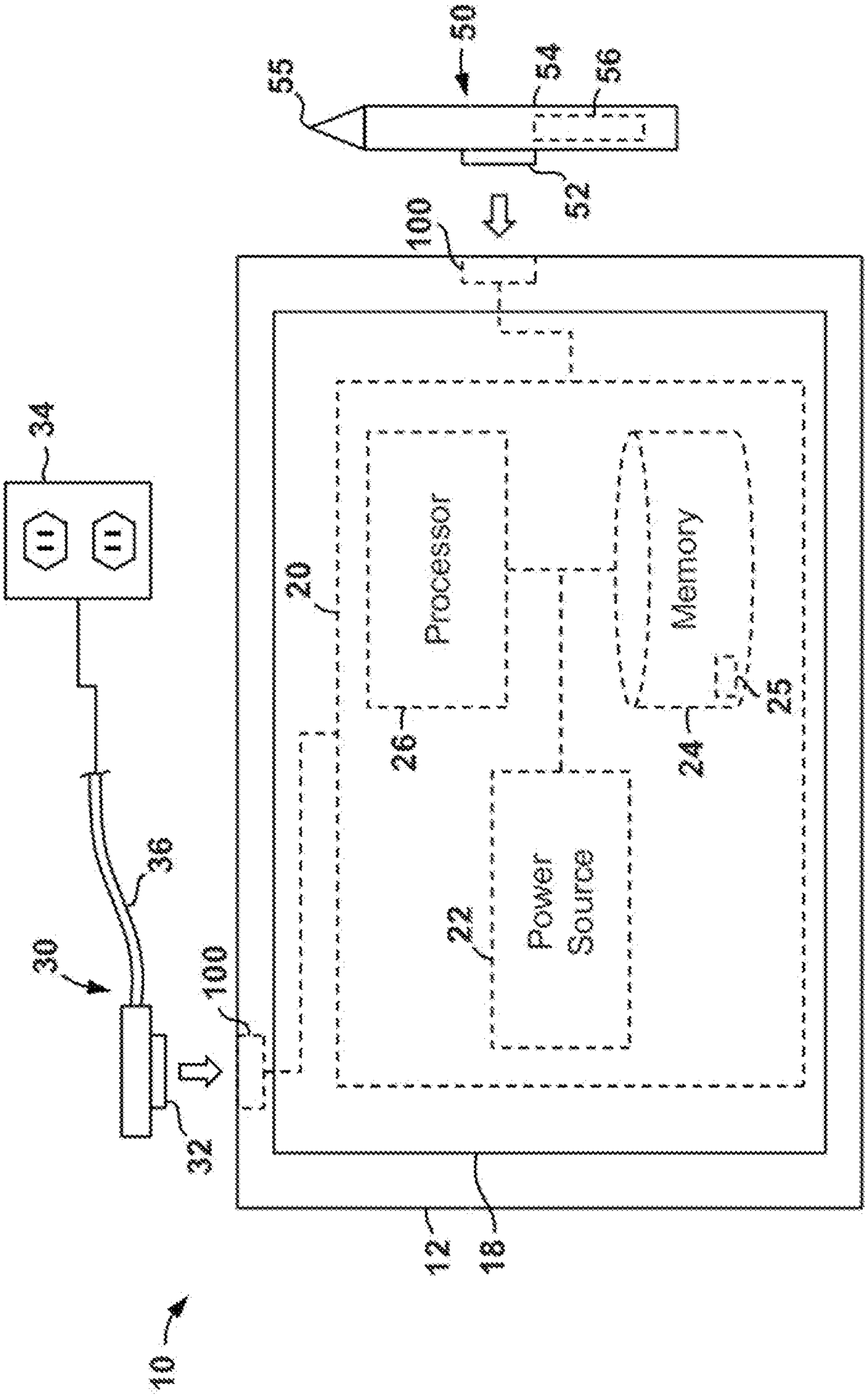
FIGS. 1 and 2 are schematic views of an electronic device including connection ports according to some examples.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally mean along or parallel to a given axis, while the terms 'radial' and "radially" generally mean perpendicular to the given axis.

For instance, an axial distance refers to a distance measured along or parallel to the axis, and a radial distance means a distance measured perpendicular to the axis.

As used herein, including in the claims, the word "or" is used in an inclusive manner. For example, "A or B" means any of the following: "A" alone, "B" alone, or both "A" and "B" In addition, when used herein including the claims, the word "generally" or "substantially" means within a range of plus or minus 10% of the stated value. As used herein, the term "electronic device," refers to a device that is an electronic component (or plurality of electronic components), such as, processors, power sources, memory devices, electrical conductors, etc. The term "electronic device" specifically includes laptop computers, tablet computers, desktop computers, servers, all-in-one computers, smartphones, as well as, docking stations, adapters (e.g., cable adapters, port adapters, etc.), etc.

As previously described above, electronic devices may include a plurality of different connection ports to allow for connection with a multitude of different plug types. However, the housings of some electronic devices may not have sufficient space to accommodate a large number of connection ports. A common connection port type that is used for many different applications is a universal serial bus (USB) connection port. A USB connection port may be utilized to transfer electric power and/or information signals (e.g., data, messages, machine-readable instructions, etc.) between two devices. As a result, many electronic devices include one or a plurality of USB connection ports. However, some connection plugs are not arranged or designed for connection with a USB connection port, so that additional ports and/or suitable adapters may be called for in order to allow connection of these additional connection plugs. Such alternative connection plugs may include a snap on or contact style connection plug that includes one or a plurality of contacts or conductive pads that are engaged with corresponding contact pads on the corresponding port. In some cases, a snap on connection plug may be engaged and secured to the corresponding connection port via magnets.

Accordingly, examples disclosed herein include connection ports that are to connect with a standard USB connection plug as well as non-USB connection plugs (e.g., such as snap on style connection plugs described above). As a result, through use of the example USB connection ports, an electronic device may accommodate a larger number of potential connection plugs without increasing the total number of available ports disposed along a housing thereof.

Referring now to FIG. 1, an electronic device 10, including connection ports 100 according to some examples, is shown. In this example, electronic device 10 comprises a tablet computer that includes a housing 12, and a display 18 coupled to and supported within the housing 12. The display 18 may comprise any suitable display device or assembly that is to generate images for viewing by a user (not shown) of the electronic device 10. For instance, in some examples, the display 18 may comprise a liquid crystal display (LCD), a plasma display, organic light emitting diode (OLED) display, etc.

Electronic device 10 also includes a plurality of electronic components 20 disposed within the housing 12. For instance, electronic components 20 may include a power source 22, a processor 26, and a memory 24. The processor 26 (e.g., microprocessor, central processing unit (CPU), or collection of such processor devices, etc.) executes machine-readable instructions 25 (e.g., non-transitory machine-readable medium) provided on memory 24. The memory 24 may comprise volatile storage (e.g., random access memory (RAM)), non-volatile storage (e.g., flash storage, read-only memory (ROM), etc.), or combinations of both volatile and non-volatile storage. Data consumed or produced by the machine-readable instructions 25 can also be stored on memory 24. Power source 22 comprises any device or collection of devices that are to receive, store, and deliver electrical power to other components or devices (e.g., processor 26, memory 24, display 18, etc.). In some examples, power source 22 comprises a battery (e.g., a rechargeable battery), but may comprise other suitable power storage device(s) (e.g., capacitors, etc.).

Electronic device 10 may include additional electronic components 20 other than those specifically shown in FIG. 1 (e.g., other than processor 26, memory 24, power source 22, etc.). For instance, electronic device 10 may include a plurality of processors 26, memories 24, power sources 22, etc., as well as other components or devices for supporting operation and use of electronic device 10 (e.g., antennas, printed circuit boards (PCBs), power distribution assemblies, etc.). These additional components or devices are not shown in FIG. 1 or descried in detail herein in the interests of conciseness and brevity.

In addition, electronic device 10 includes connection ports 100 that are arranged along outer surfaces of housing 12. Connection ports 100 are electrically coupled to the electronic components 20 within housing 12. In particular, connection ports 100 may receive or transfer electric power to or from power source 22 and/or information signals to or from processor 26 and memory 24. During operations, connection ports 100 may be connected or engaged with a USB connection plug (not shown) that is coupled to another device or system. Specifically, in some examples, the connection ports 100 may be connected or engaged with USB-A or USB-C type connection plugs (although, connection ports 100 may be compatible with other USB connection plug types in various examples). Thus, the connection ports 100 may be referred to herein as USB connection ports. Moreover, as should be apparent from the description above, no intent is expressed or desired to limit the application of the examples disclosed herein to a particular USB technology standard. Rather, it is intended that the disclosed examples be applicable to any suitable USB technology, including USB connection plugs/ports conforming with past, current, and/or future USB technology standards.

In addition, as will be described in more detail below, connection ports 100 may be coupled to additional connection plug types or designs (that is, other than USB connection plugs). For instance, connection ports 100 may be coupled and engaged with so-called snap on style connection plugs that are generally described above. In some examples, the connection ports 100 may engage with a snap on style connection plug for purposes of transferring electrical power and/or information signals. For instance FIG. 1 shows an electrical power charging assembly 30 that includes a connection plug 32 that may be engaged within one of the connection ports 100. The electrical power charging assembly 30 may additionally be electrically coupled to an electrical outlet 34 or other suitable source of electric power (e.g., via cable or other suitable conductor) via a cable 36, so that electrical power may be provided to power source 22 (e.g., for power charging operations) from the electrical outlet 34, through the engaged connection plug 32 and connection port 100.

FIG. 1 also shows an accessory device 50 that includes another connection plug 52 that may be engaged within another of the connection ports 100 to thereby physically connect the accessory device 50 to electronic device 10 (e.g., for electrical power or information signal transfer therebetween). The accessory device 50 may comprise any suitable assembly, system, or device that may run or operate utilizing electrical power. In some examples, the accessory device 50 may be a device that is utilized to make inputs to the electronic device 10. In this example, accessory device 50 comprises a stylus (e.g., a smart pen); however, other suitable accessory devices may include, for instance, a keyboard, a mouse, a light, a fan, a speaker, etc.

As will be described in more detail below, the connection plugs 32 and 52 on the electrical power charging assembly 30 and accessory device 50 are so called snap on connection plugs. Thus, during operations, connection ports 100 may be engaged with either a USB connection plug (e.g., a USB-A or USB-C connection plug in some examples), or the snap on connection plugs 32, 52 so that the overall number of connection ports (e.g., connection ports 100) disposed along housing 12 of electronic device 10 may be reduced.

Figure 2:
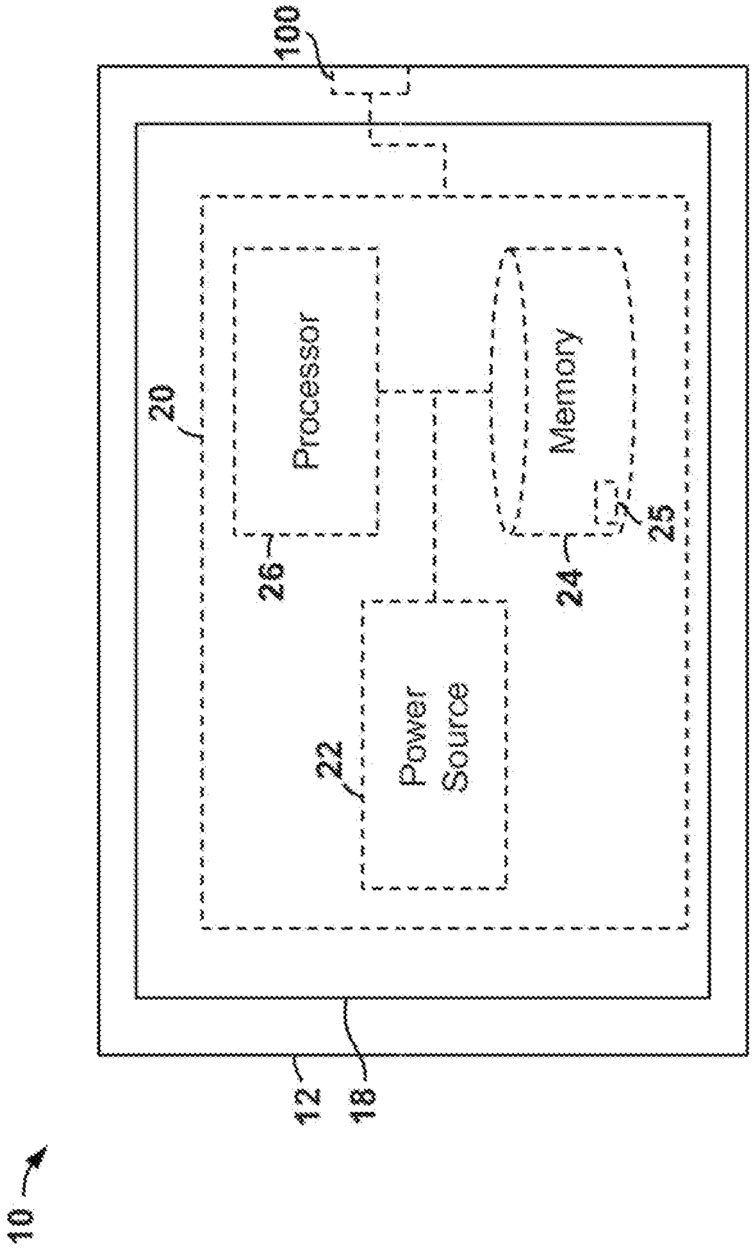

Referring briefly to FIG. 2, in some examples, a single port 100 may be included on housing 12 of electronic device 10. In addition, in some examples, more than two connection ports 100 may be included on the housing of electronic device 10. Further, while electronic device 10 has been shown as a tablet computer, in other examples, connection ports 100 may be included along any other suitable type of electronic device (e.g., laptop computer, smartphone, desktop computer, all-in-one computer, stand-alone displays such as computer monitors, televisions, etc.). In addition, in some examples, connection ports 100 may be included on adapters, cable ends, docking stations, wall outlets, etc. Further details are provided below of examples of the connection ports 100, and the connection or engagement with corresponding connection plugs.

Figure 3:
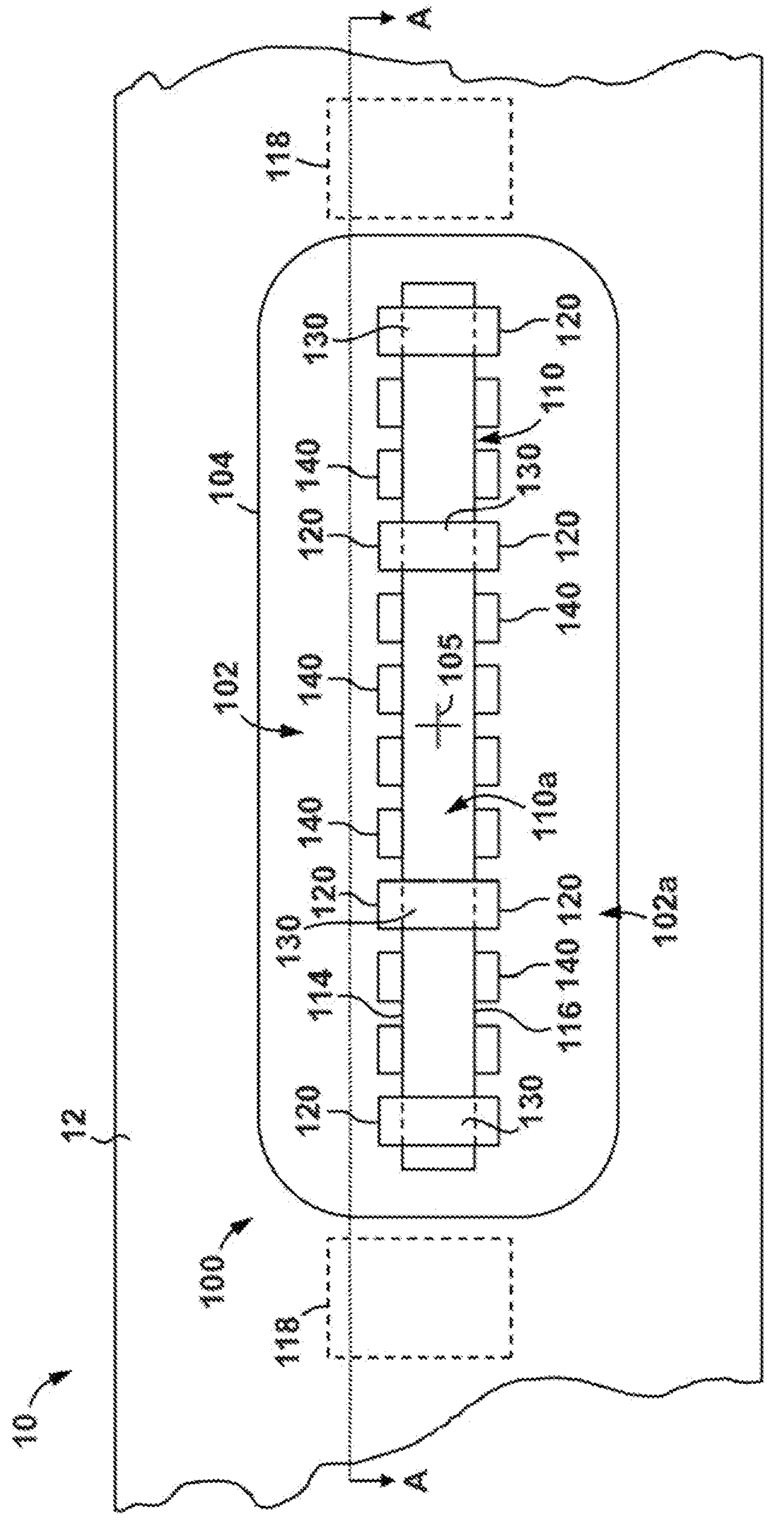
FIG. 3 is a front view of a connection port that ay be coupled to an electronic device according to some examples.
Figure 4:
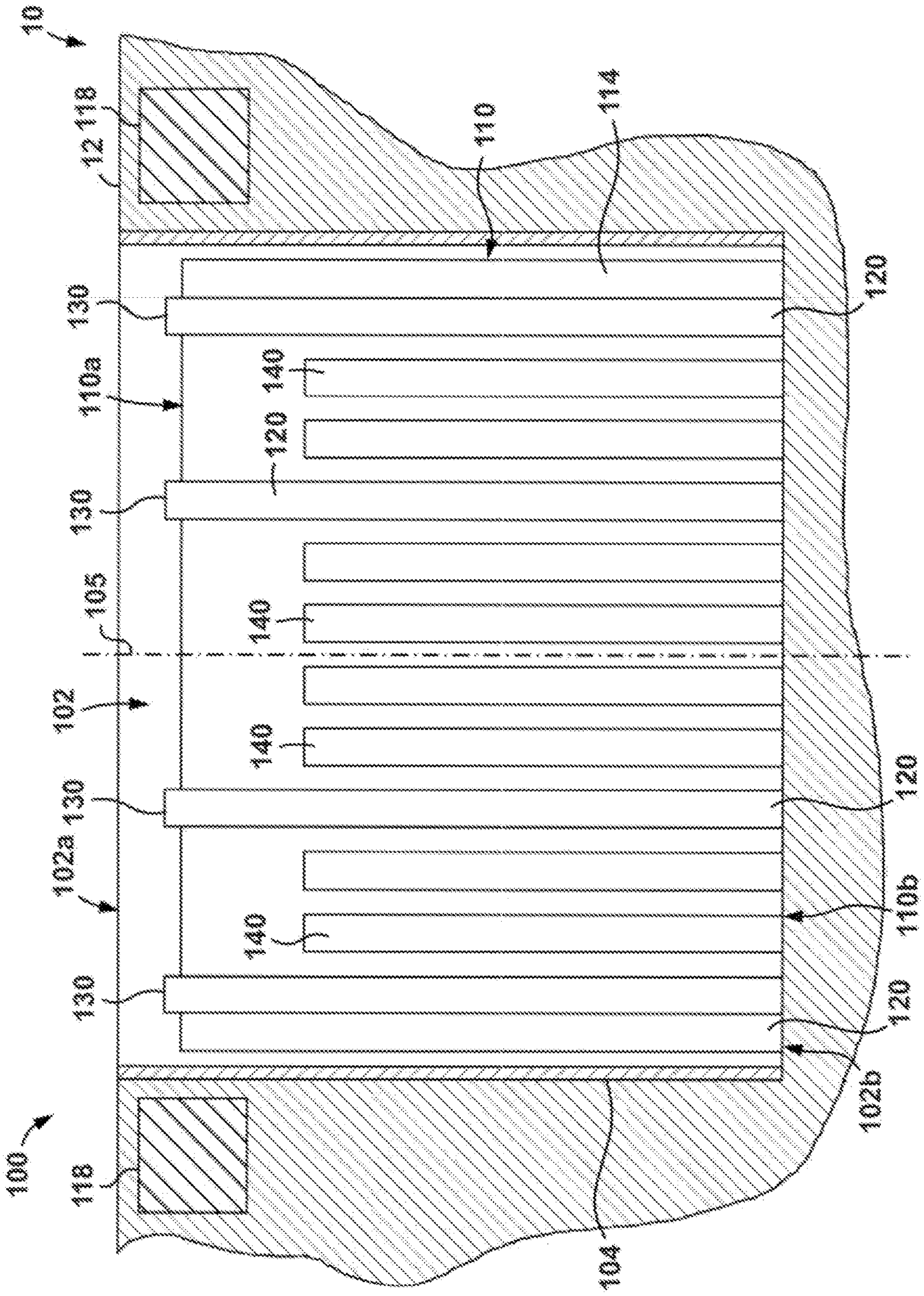
FIG. 4 is a top, cross-sectional view along section A-A in FIG. 3 according to some examples.

Referring now to FIGS. 3 and 4, one connection port 100 is shown; however, the following description may be applied to describe any other connection port(s) 100 coupled to electronic device 10 (see e.g., FIG. 1). Generally speaking, connection port 100 includes a central or longitudinal axis 105, connection port housing 104 that includes a receptacle 102 extending axially along the longitudinal axis 105, and a substrate 110 disposed within the receptacle 102.

Connection port housing 104 is installed or mounted within a suitable port or aperture within housing 12. In some examples, the receptacle 102 may be defined by a port or aperture in the housing 12 (that is, no additional connection port housing 104 of connection port 100 is included). Receptacle 102 includes a first or front end 102*a* and a second or back end 102*b* opposite front end 102*a*. The front end 102*a* may form an opening into receptacle 102 to allow receipt of a suitable connection plug (e.g., connection plugs 32, 52 in FIGS. 1 and 2) therein during operations. In some examples, front end 102*a* may be flush (or aligned or coplanar) with an outermost surface of housing 12, or may be inset within housing 12 or projected from housing 12. Receptacle 102 may include any suitable shape or size. For instance, as best shown in FIG. 3, in some examples receptacle 102 may comprise a generally rectangular shape (e.g., a rounded rectangular shape).

Substrate 110 extends along longitudinal axis 105 within receptacle 102 and includes a first or front end 110*a* and a second or back end 110*b* opposite front end 110*a*. In addition, substrate 110 includes a first or upper support surface 114 and a second or lower support surface 116. The upper support surface 114 and the lower support surface 116 both extend axially along longitudinal axis 105. In this example, substrate 110 is generally coaxially aligned along longitudinal axis 105 so that upper support surface 114 is radially opposite the lower support surface 116 across the longitudinal axis 105. The upper support surface 114 and the lower support surface 116 are both planar surfaces that extend axially between ends 110*a*, 110*b*. Substrate 110 may comprise any suitable material for supporting electrical contacts. In some examples, substrate 110 comprises a dielectric material (e.g., such as a polymer).

A plurality of magnets 118 are disposed within the housing 12 of electronic device 10 and arranged about the connection port 100. In this example, two magnets 118 are shown disposed on radially opposing sides of connection port 100, with respect to longitudinal axis 105. However, any number and arrangement of magnets 118 may be used in other examples. In some examples, magnets 118 are permanent magnets; however, in some examples, magnets 118 (or some of magnets 118) may be electromagnets. Regardless, during operations, magnets 118 are to generate a magnetic field that extends outside of and beyond housing 12. As will be described in more detail below, the magnetic field (not shown) generated by magnets 118 is to attract corresponding magnets (or magnetically sensitive materials) coupled to a corresponding connection plug (e.g., connection plugs 32, 52 shown in FIG. 1), so as to encourage connection or coupling between the connection plug and the connection port 100 during operations.

Several electrical contacts are coupled to the substrate 110 that are to be coupled to another device so as to transfer electrical power and/or information signals between another device (e.g., electrical charging assembly 30, accessory device 50 in FIG. 1) and the electronic device 10 during operations. In particular, the connection port 100 includes a plurality of first electrical contacts 120, a plurality of second electrical contacts 130, and a plurality of third electrical contacts 140.

The first electrical contacts 120 and the third electrical contacts 140 are disposed on the upper support surface 114 and the lower support surface 116 of substrate 110. In some examples, the first electrical contacts 120 and the third electrical contacts 140 are disposed along a single one of the upper support surface 114 and the lower support surface 116 (e.g., such as in examples wherein the connection port 100 is to engage with a USB-A type connection plug). The first electrical contacts 120 and the third electrical contacts 140 are elongate, electrically conductive members that generally extend in an axial direction with respect to longitudinal axis 105. Thus, first electrical contacts 120 and third electrical contacts 140 may extend parallel to one another along the upper support surface 114 and the lower support surface 116. In particular, each first electrical contact 120 and each third electrical contact 140 extends axially from the back end 110*b* of substrate 110 toward front end 110*a*. In addition, the third electrical contacts 140 are interspersed between the first electrical contacts 120 along support surfaces 114, 116 (and thus, the first electrical contacts 120 are interspersed between the third electrical contacts 140 along support surfaces 114, 116); however, any order or relative arrangement of the first electrical contacts 120 and third electrical contacts 140 may be utilized in various examples.

In this example, the first electrical contacts 120 are electrically coupled to a source of electric power within the electronic device 10, such as, for instance, power source 22 shown in FIGS. 1 and 2. In addition, in this example, the third electrical contacts 140 are coupled to processors and/or memories (and/or other electronic components) within electronic device 10, such as, for instance, processor 26 and memory 24. Thus, during operations, first electrical contacts 120 are to transfer electric power to and from the power source(s) (e.g., power source 22) disposed within the electronic device 10 and third electrical contacts 140 are to transfer information signals to and from other electronic devices or components within electronic device 10 (e.g., processor 26 and memory 24).

Referring still to FIGS. 3 and 4, the second electrical contacts 130 are disposed on the front end 110*a* of substrate 110. In addition, in some examples (e.g., such as the example of FIGS. 3 and 4), the second electrical contacts 130 are electrically coupled to corresponding ones of the first electrical contacts 120, so that the second electrical contacts 130 are also electrically coupled to a source of electric power within electronic device 10 (e.g., power source 22 in FIG. 1). In some examples, some of the first electrical contacts 120 and some of the second electrical contacts 130 are electrically coupled to an electrical ground, and a remaining ones of the first electrical contacts 120 and the second electrical contacts 130 are electrically coupled to the electrical power source(s) within electronic device 10 (e.g., power source 22 in FIG. 1).

In addition, as is best shown in FIG. 4, the second electrical contacts 130 may also project or extend axially outward from front end 110*a* of substrate 110. As will be described in more detail below, during operations the second electrical contacts 130 are to engage with the corresponding contacts of a snap on connection plug (e.g., plugs 32, 52 in FIGS. 1 and 2), while the first electrical contacts 120 and third electrical contacts 140 are to engage with corresponding electrical contacts in a USB connection plug.

Figure 5:
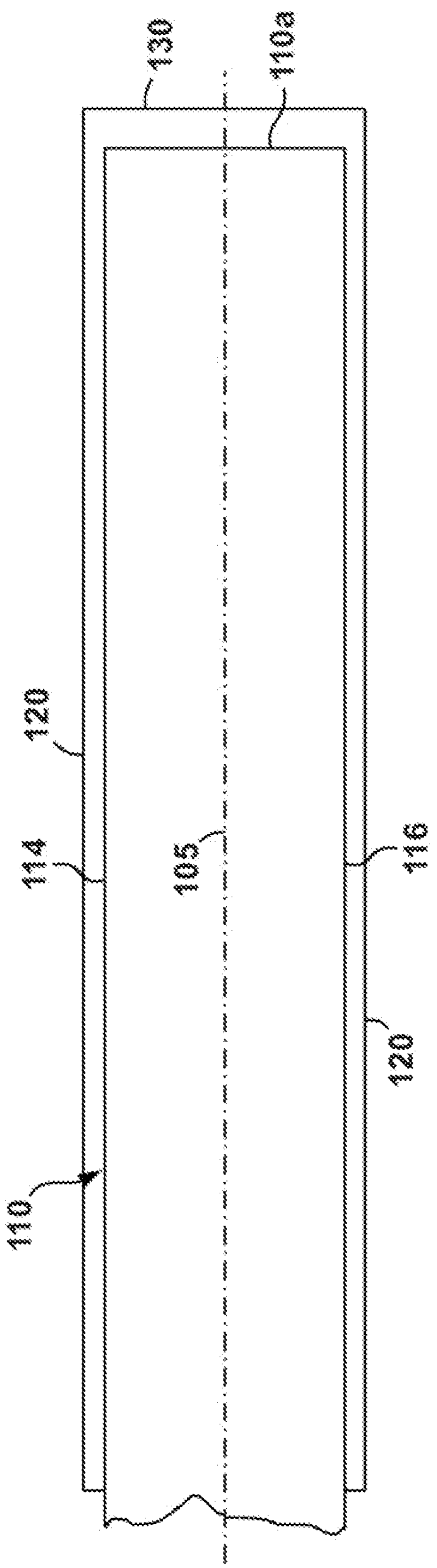
FIG. 5 is a side view of a substrate and electrical contacts for use within a connection port according to some examples.

The electrical coupling between the first electrical contacts 120 and the second electrical contacts 130 may be accomplished in a number of different manners. For instance, referring now to FIG. 5, in some examples the second electrical contacts 130 are continuously formed with corresponding one(s) of the first electrical contacts 120. Specifically, in the example shown in FIG. 5, each second electrical contact 130 is formed as one continuous piece, monolithic body or member with a corresponding pair of the first electrical contacts 120 (e.g., one first electrical contact 120 that extends along the upper support surface 114, and another first electrical contact 120 that extends along the lower support surface 116. In some examples, each second electrical contact 130 may be continuously formed with a single corresponding one of the first electrical contacts 120 on the upper support surface 114 or the lower support surface 116 of substrate 110.

Figure 6:
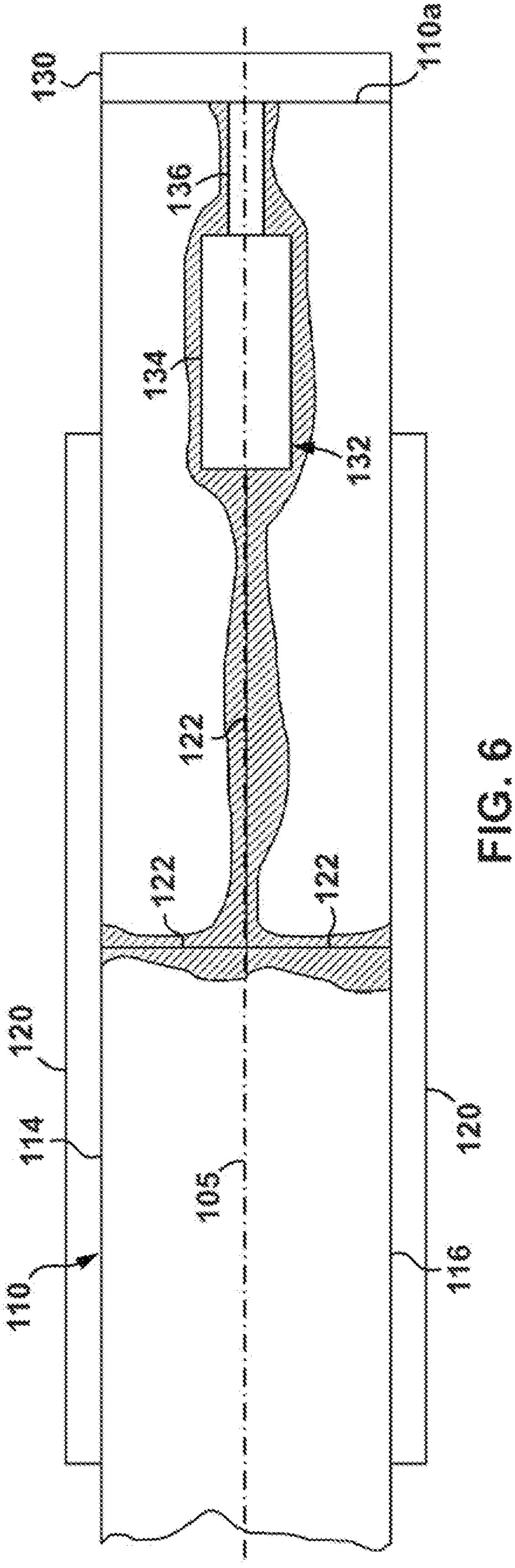
FIGS. 6 and 7 are side, partial cross-sectional views of a substrate and electrical contacts for use in a connection port according to some examples.

In some examples, the second electrical contacts 130 are formed as separate bodies or members from the first electrical contacts 120, but are still electrically coupled to one another as generally described above. For instance, referring now to FIG. 6, wherein a second electrical contact 130 is shown electrically coupled to a corresponding pair of the first electrical contacts 120 via electrical conductors 122 that are disposed within the substrate 110. The conductors 122 may comprise any suitable electrically conductive wire, trace, contact, or combination thereof, and are merely represented schematically in FIG. 5 so as to simplify the figure.

In addition, in some examples, the second electrical contacts 130 are axially biased away from the front end 110*a* of substrate 110. For instance, in the example of FIG. 6, an electrically conductive biasing assembly 132 is disposed within substrate 110 to bias the depicted second electrical contact 130 axially outward or away from front end 110*a* of substrate 110. Biasing assembly 132 includes a housing 134 and a piston 136 axially biased outward from the housing 134 (e.g., with a suitable biasing member or assembly that may include a spring, compressed fluid chamber, etc.). The second electrical contact 130 is secured to piston 136. Thus, during operations, the piston 136 is axially biased out of the housing 134 which in turn also axially biases second electrical contact 130 away from the front end 110*a* of substrate 110. All (or a plurality) of the second electrical contacts 130 may be coupled to a corresponding biasing assembly 132 (e.g., in the manner shown in FIG. 6) so that connection port 100 may comprise a plurality of biasing assemblies 132.

Figure 7:
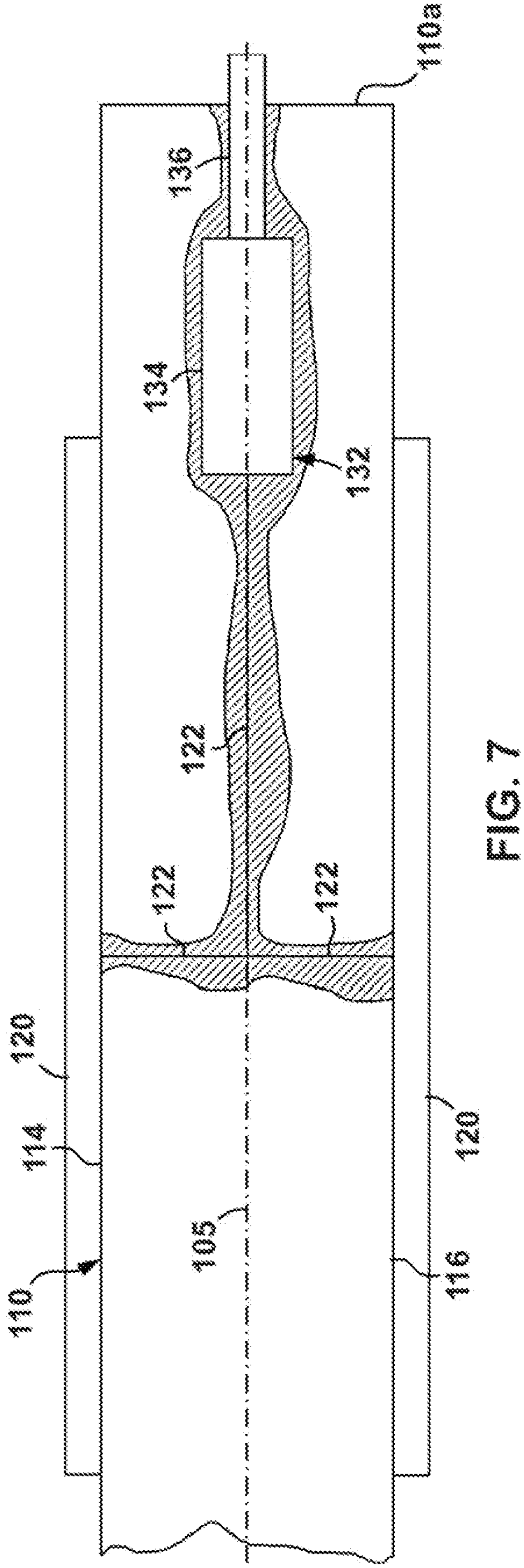

Moreover, the housing 134 and piston 136 may be electrically coupled to the conductors 122 and may comprise electrically conductive material(s) so as to transfer electric current between the second electrical contact 130 and the conductors 122 during operations. Referring briefly now to FIG. 7, in some examples, the piston 136 of the biasing members 132 may serve as the second electrical contacts 130 themselves so that the end of the piston 136 may axially project from the front end 110*a* of substrate 110 during operations.

Electrical contacts 120, 130, 140 may comprise any suitable electrical conductive material. For instance, in some examples, the electrical contacts 120, 130, 140 may comprise a metallic material, such as copper, aluminum, gold, platinum, etc. In some examples, the electrical contacts 120, 130, 140 may comprise the same materials; however, in other examples, electrical contacts 120, 130, 140 (or some of the electrical contacts 120, 130, 140) may comprise different materials.

In addition, while the examples if FIGS. 3-7 include second electrical contacts 130 that are electrically coupled to a source of electrical power within an electronic device 10 (e.g., power source 22 in FIGS. 1 and 2), in other examples, some (or all) of the second electrical contacts 130 may be electrically coupled to other electrical components (e.g., processor 26, memory 24 in FIGS. 1 and 2) within an electronic device 10, so that second electrical contacts 130 may transfer or conduct information signals in addition to or in lieu of electrical power. For instance, in some examples, some or all of the second electrical contacts 130 may be electrically coupled to corresponding ones of the third electrical contacts 140 in the manner described above for the first electrical contacts 120 (see e.g., FIGS. 5-7).

During operations, connection ports 100 may be engaged with a USB connection plug or a snap on type connection plug so as to facilitate the transfer of electrical power and/or information signals therebetween. For instance, reference is now made to FIG. 8, which shows a USB connection plug 80 inserted within and engaged with connection port 100. USB connection plug 80 is coupled to another device (e.g., keyboard, mouse, light, another electronic device, etc.) via a cable 82. In addition, in this example, USB connection plug 80 is a USB-C style connection plug, and thus, includes an inner dielectric sleeve 84 including a plurality of electrical contacts 86 coupled to and disposed along an inner surface of the sleeve 86. While not specifically shown, the electrical contacts 86 are also coupled to the other device (not shown) via a plurality of conductors (or conductive paths) that extend through cable 82.

Figure 8:
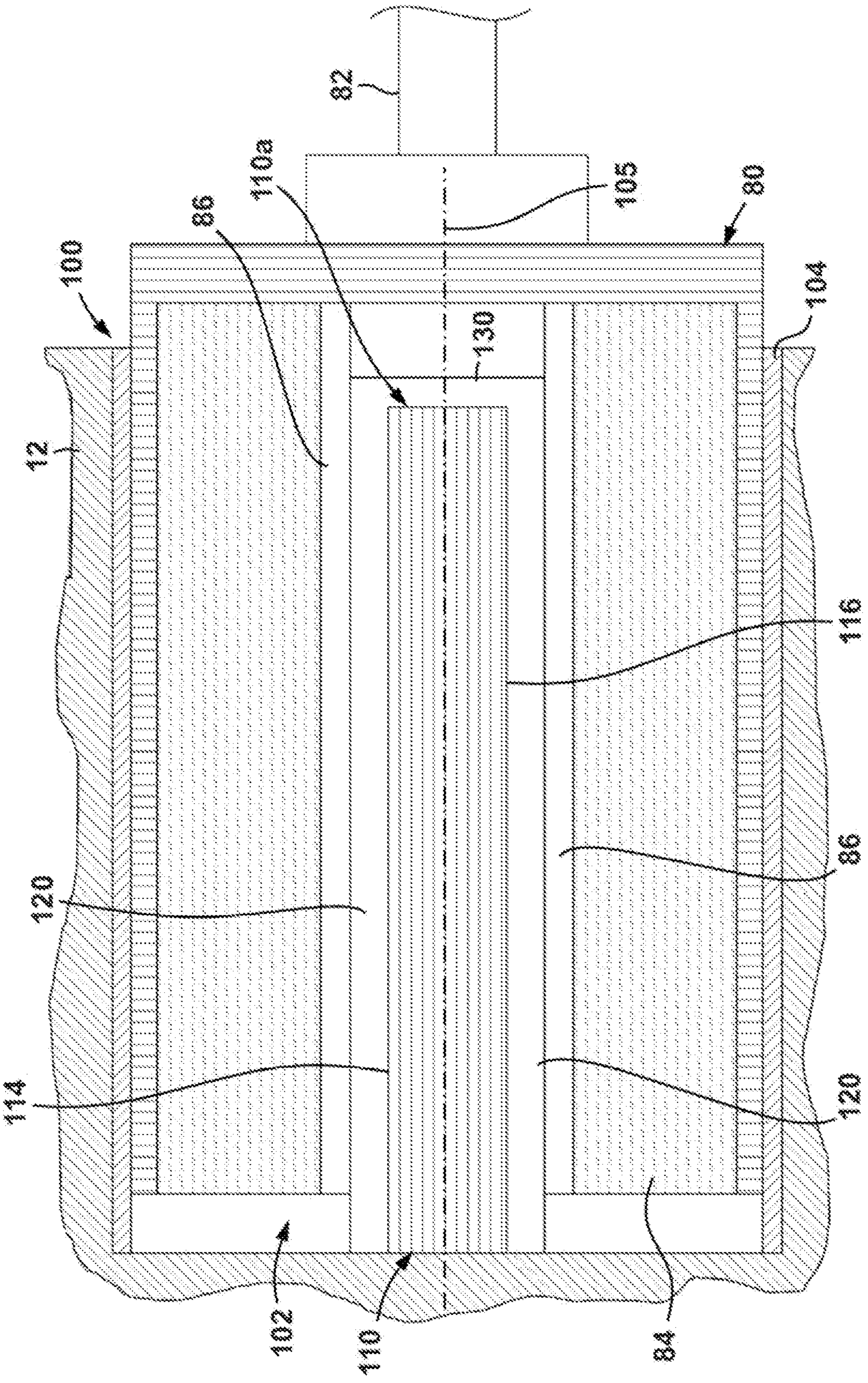
FIG. 8 is a side, cross-sectional view of a connection port engaged with a universal serial bus (USB) connection plug according to some examples.

As shown in FIG. 8, during operations, the USB connection plug 80 is inserted within receptacle 102 along axis 105 such that substrate 110 and electrical contacts 120, 130, 140 are received within sleeve 84. The view shown in FIG. 8, does not show the third electrical contacts 140 on the upper support surface 114 and lower support surface 116. However, the relative arrangement of the first electrical contacts 120 and the third electrical contacts 140 along the support surfaces 114, 116 is shown in FIGS. 3 and 4 and previously described above. In addition, the example of substrate 110 and electrical contacts 120, 130, 140 of FIG. 8 are arranged in the manner shown in FIG. 5 (e.g., wherein the second electrical contacts 130 are formed as single-piece continuous bodies with corresponding ones of the first electrical contacts 120 as previously described above); however, it should be noted that any of the example arrangements of substrate 110 and electrical contacts 120, 130, 140 previously described above (see e.g., FIGS. 5-7) may be utilized for connection with USB connection plug 80 in other examples.

When USB connection plug 80 is inserted within receptacle 102 along axis 105 and substrate 110 and electrical contacts 120, 130, 140 are received within sleeve 84, the electrical contacts 120, 140 are brought into engagement with corresponding ones of the electrical contacts 86. Specifically, when USB connection plug 80 is inserted within receptacle 102 of connection port 100, the electrical contacts 86 are oriented parallel with the longitudinal axis 105 and are engaged along corresponding ones of the electrical contacts 120, 140 disposed on upper support surface 114 and lower support surface 116 of substrate 110. The third electrical contacts 130 are disposed within the sleeve 84 and are not generally in contact with any electrical contacts of USB connection plug 80.

Thus, as a result of the engagement between the first and third electrical contacts 120, 140 of connection port 100 and the electrical contacts 86 on USB connection plug 80, electrical power and/or information signals may be transferred between electronic device 10 and the other device (not shown) coupled to USB connection plug 80.

Figure 9:
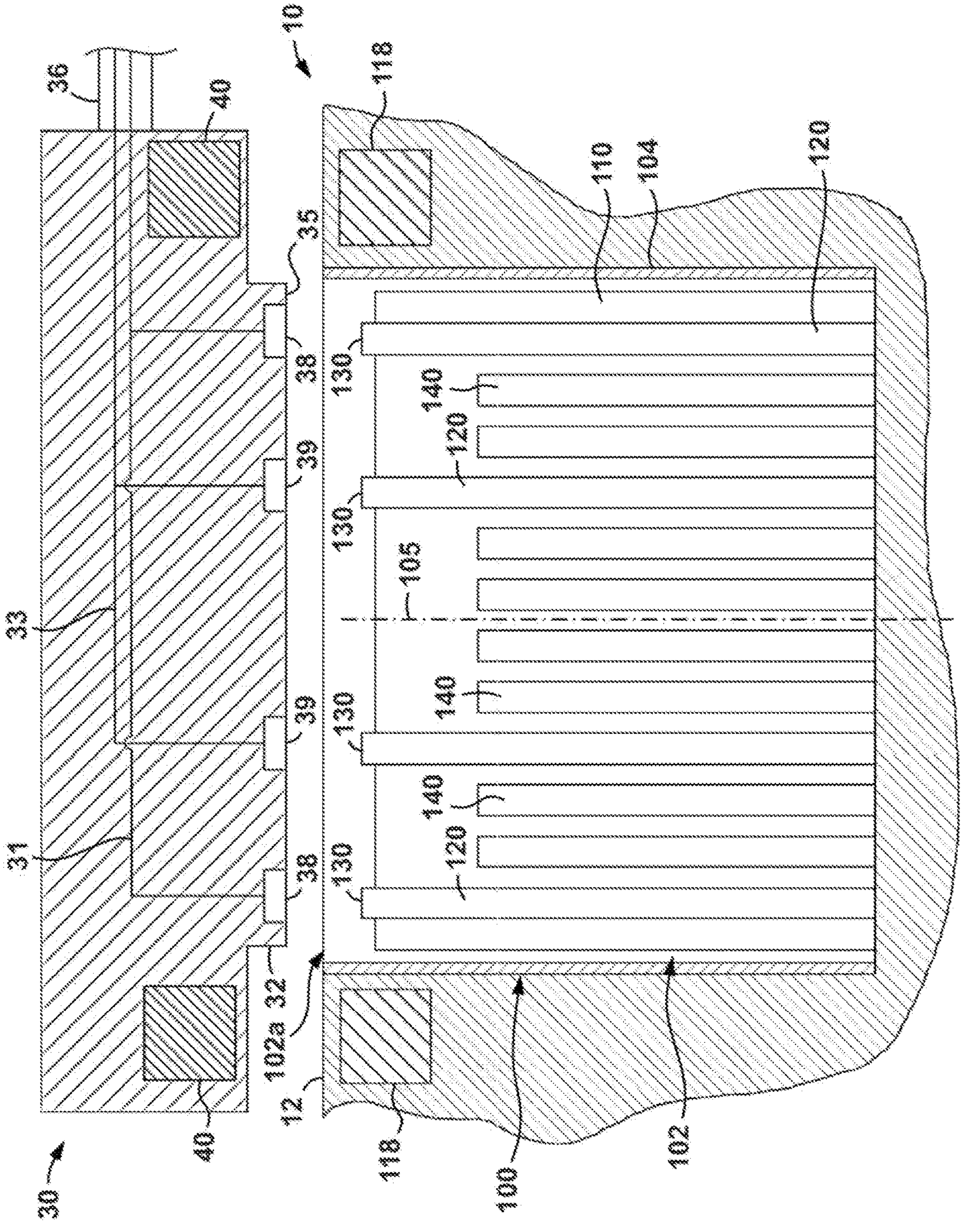
FIG. 9 is a top, cross-sectional view of a connection port and a snap on connection plug of an electrical power charging assembly according to some examples.

Referring now to FIGS. 1 and 9, as previously described connection ports 100 may also be engaged with snap on connection plugs (e.g., connection plugs 32, 52 shown in FIG. 1) to transfer electric power and/or information signals between electronic device 10 and a separate device during operations. In particular, as shown in FIG. 9, connection plug 32 of electrical power charging assembly 30 may be engaged with one of the connection ports 100 of electronic device 10 to transfer electrical power from electrical outlet 34 to power source 22 within electronic device 10.

The connection plug 32 may include a plurality of electrical contacts 38, 39 that are disposed on a projected surface 35 or end of connection plug 32. The electrical contacts 38, 39 may be electrically coupled to electrical outlet 34 (see e.g., FIG. 1) via a plurality of electrical conductors (or conductive paths) 31, 33, that extend through cable 36. In particular, in some examples (e.g., such as the example of FIG. 9), the electrical contacts 38 may be coupled to an electrical ground via the electrical conductors 31, and the electrical contacts 39 may be coupled to an electrical power source (e.g., electrical outlet 34) via the electrical conductors 33. The electrical conductors 31, 33 may extend through a suitable cable (or other conduit) to couple with electrical outlet 34 via a suitable connector (e.g., such as a wall plug).

During operations, the connection plug 32 may be inserted within receptacle 102 from front end 102*a* along axis 105 so as to engage the electrical contacts 38, 39 with corresponding ones of the second electrical contacts 130 disposed on front end 110*a* of substrate 110. Thus, in some examples, the second electrical contacts 130 that are to engage with the electrical contacts 38 on connection plug 32 may be electrically coupled to an electrical ground, and the second electrical contacts 130 that are to engage with the electrical contacts 39 on connection plug 32 may be electrically coupled to a power source (e.g., power source 22 in FIGS. 1 and 2) in electronic device 10. Accordingly, once connection plug 32 is inserted within receptacle 102, electric current may be conducted between the electrical outlet 34 and power source 22 in electronic device 10 via the engagement between electrical contacts 39 on connection plug 32 and the corresponding second electrical contacts 130 disposed on connection port 100.

A pair of magnets 40 may be coupled to electrical power charging assembly 30 that are arranged or disposed about connection plug 32. During operations, as connection plug 32 is inserted within receptacle 102, magnets 40 may be attracted to the magnets 118 disposed about connection port 100 so as to align the electrical contacts 38, 39 with the corresponding second electrical contacts 130 of connection port 100. In addition, the attractive force between the magnets 40, 118 may also hold or secure the connection plug 32 within the connection port 100 so as to restrict or prevent unintentional disconnection of connection plug 32 from connection port 100 during operations.

Figure 10:
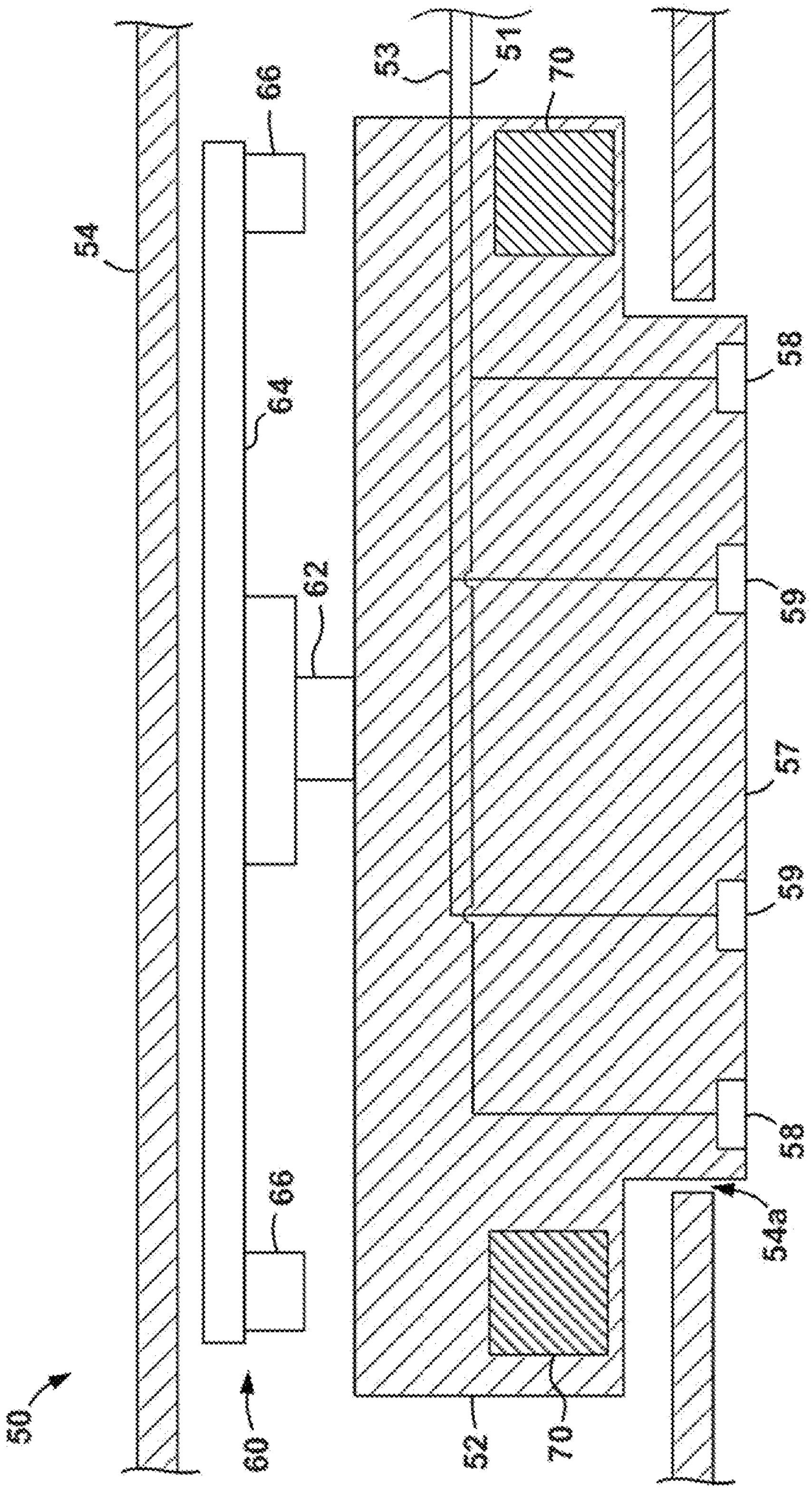
FIG. 10 is a cross-sectional view of a snap on connection plug of an accessory device according to some examples.
Figure 11:
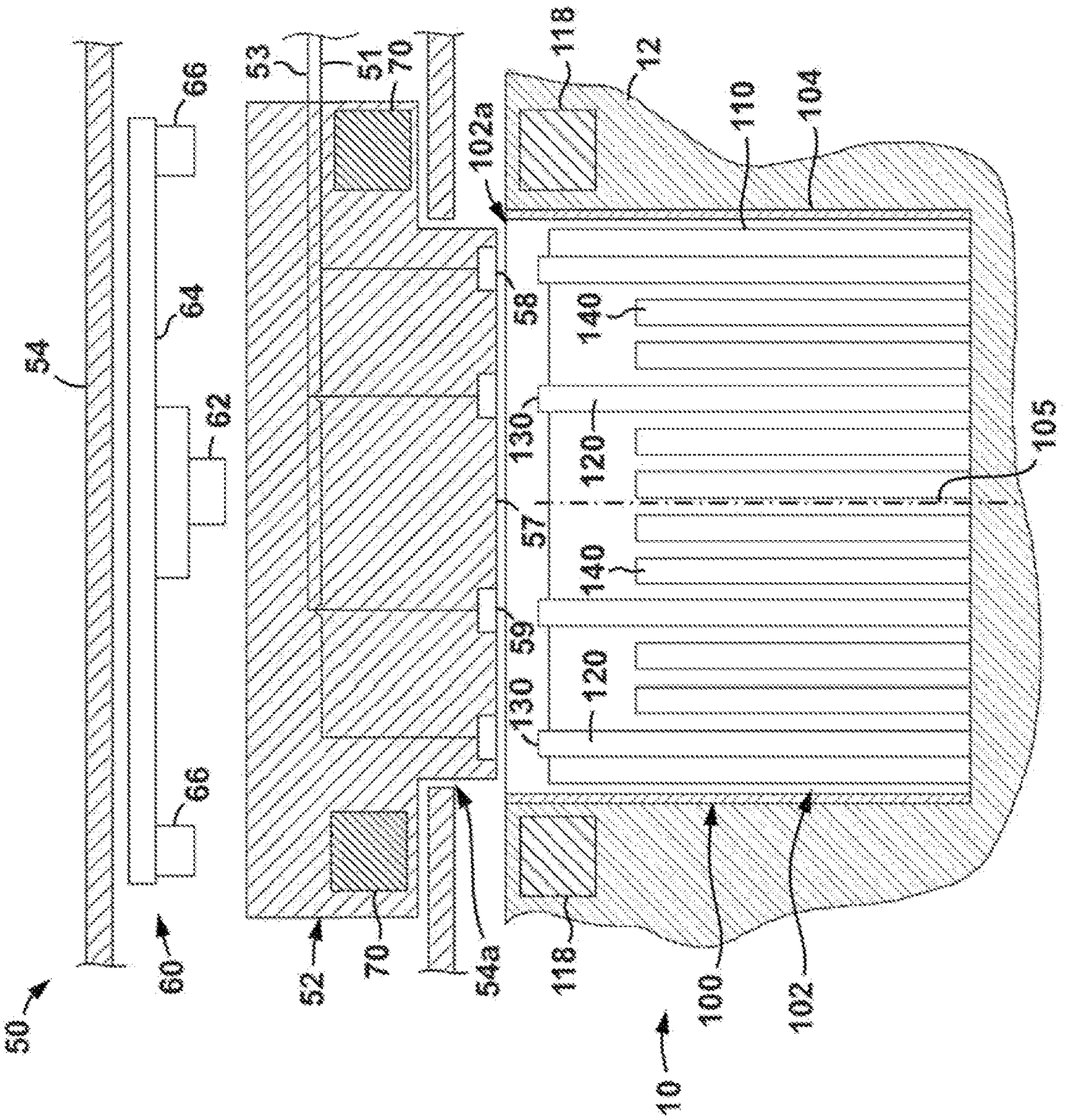
FIG. 11 is a top, cross-sectional view of a connection port and the connection plug of FIG. 10 according to some examples.

Referring now to FIGS. 1, 10, and 11, in some examples, connection plug 52 of accessory device 50 may be engaged with one of the connection ports 100 of electronic device 10. For instance, as shown in FIG. 11, in some examples, connection plug 52 of accessory device 50 may be engaged with one of the connection ports 100 so as to transfer electrical power and/or information signals between accessory device 50 and electronic device 10.

Referring specifically to FIG. 1, accessory device 50 comprises a stylus for providing inputs to electronic device 10 as previously described above. Thus, accessory device 50 includes an elongate body 54, and a tip or point 55 at one end of the body 54. Generally speaking, during operations, a user (not shown) may grasp body 54 and engage point 55 with a touch sensitive surface on or coupled to electronic device 10 (e.g., such as display 18, or a separate touch pad, etc.). In addition, accessory device 50 may include internal electronic components 56 that may comprise some or all of the same types of electronic components 20 discussed above for electronic device 10 (e.g., power source(s), processor(s), memory(ies), etc.). Thus, accessory device 50 may comprise a so-called “smart pen” that is to communicate with electronic device 10 (e.g., via a wired or wireless connection) and perform functions either alone or in combination with electronic device 10 or other devices.

Referring now to FIG. 10, accessory device 50 may include an internal switch assembly 60 disposed within body 54. Switch assembly 60 may comprise a portion of the electronic components 56 disposed within body 54 generally noted above (see e.g., FIG. 1). Switch assembly 60 comprises a switch 62 that, when actuated, is to provide an electronic input to accessory device 50 which may cause or trigger accessory device 50 to perform a function, change a power state, and/or initiate a wireless pairing or other connection procedure, etc. Switch 62 may be mounted to a suitable substrate or surface 64 within body 54 that may comprise a surface (e.g., an internal surface) of body 54 and/or a separate member (e.g., a printed circuit board (PCB), etc.) disposed within body 54. A plurality of magnets 66 are also coupled to the substrate 64, or to another surface within body 54. The magnets 66 are to generate a magnetic field and may comprise electromagnets or permanent magnets as previously described above for magnets 118 disposed about connection ports 100 (see e.g., FIGS. 3 and 4).

The switch assembly 60 is disposed within body 54 adjacent to the connection plug 52. The connection plug 52 may include a plurality of electrical contacts 58, 59 that are disposed on a projected surface 57 or end of connection plug 52. The electrical contacts 58, 59 may be electrically coupled to some or all of the electronic components 56 within body 54 via a plurality of electrical conductors (or conductive paths) 51, 53. In particular, in some examples (e.g., such as a the example of FIG. 9), the electrical contacts 58 may be coupled to an electrical ground via the electrical conductors 51, and the electrical contacts 59 may be coupled to an electrical power source (e.g., electrical outlet 34) via the electrical conductors 53. The connection plug 52 may be disposed within body 54 such that projected surface 57 and electrical contacts 58, 59 are projected outward from a port or aperture **54*a* in body 54**.

A pair of magnets 70 may be coupled to connection plug 52. During operations, when connection plug 52 of accessory device 50 is not engaged with one of the connection ports 100 on electronic device 10, the magnets 70 are attracted to the magnets 66 coupled to substrate 64 of switch assembly 60 so that connection plug 52 is shifted within body 54 toward switch assembly 60 as shown in FIG. 10. In the position of FIG. 10, the projected surface 57 and electrical contacts 58, 59 may still project outward from aperture **54*a* in body 54. In addition, connection plug 52 may bear against or may be proximate to switch 62 of switch assembly 60. Accordingly, during operations, magnets 66 may generally attract connection plug 52 toward switch 62 within body 54. Thus, a user may apply pressure to projected surface 57 so as to depress connection plug 52 into aperture 54*a* and actuate switch 62 during operations. Therefore, when connection plug 52 is not engaged within a connection port 100 on electronic device 10, the connection plug 50 may serve as an external button or switch for initiating or triggering an actuation of the electronic components 56 within body 54 of accessory device 50**.

Referring specifically now to FIG. 11, during operations, when connection plug 52 of accessory device 50 is brought into the proximity of connection port 100 on electronic device 10, the magnets 118 within housing 12, about connection port 100 may attract the magnets 70 of connection plug 52 so as to shift connection plug 52 within body 54 to extend projected surface 57 and electrical contacts 58, 59 outward from aperture **54*a* and generally toward receptacle 102 of connection port 100. Thus, in some examples, the magnets 118, 70, 66 may be arranged and designed such that the magnetic attraction between the magnets 118, 70 is generally stronger than the magnetic attraction between the magnets 70, 66 when connection plug 52 of accessory device 50 is placed proximate the connection port 100 on electronic device 10 (e.g., as shown in FIG. 11**) during operations.

Thereafter, the projected surface 57 and electrical contacts 58, 59 may be inserted within receptacle 102 and engaged with the second electrical contacts 130 in the manner previously described above for the electrical contacts 38, 39 on projected surface 35 of connection plug 32 (see e.g., FIG. 9). Accordingly, this description is largely not repeated herein in the interests of brevity and conciseness. However, it should be noted that in some examples, the second electrical contacts 130 that are to engage with the electrical contacts 58 on connection plug 52 may be electrically coupled to an electrical ground, and the second electrical contacts 130 that are to engage with the electrical contacts 59 on connection plug 52 may be electrically coupled to a power source (e.g., power source 22 in FIGS. 1 and 2) in electronic device 10. In addition, once the connection plug 52 is inserted within receptacle 102 of connection port 100, the magnetic attraction (or attractive force) between the magnets 70, 118 may also hold or secure the connection plug 52 within the connection port 100 so as to restrict or prevent unintentional disconnection of connection plug 52 from connection port 100 during operations.

Referring again to FIGS. 10 and 11, in some examples, the magnets 66 (or some of the magnets 66) may be replaced with a biasing assembly (or a plurality of biasing assemblies) (not shown) that are to bias the connection plug 52 inward into the body 54 of accessory device 50 in the manner described above for the magnetic attraction between magnets 66, 70. In some examples, the biasing assembly(ies) (not shown) may comprise coiled springs coupled between the substrate 64 and connection plug 52 that are stretched when connection plug 52 is shifted so as to extend projected surface 57 outward from aperture 54*a* in body 54 (e.g., such as when magnets 70 of connection plug 52 are attracted to the magnets 118 disposed about connection port 100 as described above). Alternatively, in some examples, coiled springs may be disposed between the body 54 about the aperture 54*a* and the connection plug 52 that are compressed when connection plug 52 is extended outward from aperture 54*a*. Regardless of the particular placement and arrangement of the biasing assembly(ies) (not shown), once the connection plug 52 is moved away from the connection port 100 (and thus away from the magnets 118 disposed about connection port 100), the biasing assembly(ies) (not shown) may retract the connection plug 52 back into the body 54 as generally described above. In some examples, the biasing assembly(ies)(not shown) replacing the magnets 66 (or perhaps some of the magnets 66) may comprise any other suitable biasing members or assemblies other than coiled springs (e.g., a biased piston or plunger, a flat spring, etc.), or may comprise a combination of suitable biasing members or assemblies (including coiled springs as previously described above).

In some examples, some of the magnets 118, 40, 66, 70 described above (see e.g., FIGS. 9-11) may be replaced (in some examples) with magnetically sensitive materials in various examples. As used herein, the term 'magnetically sensitive material' comprises any material (or combination of materials) that is movable (e.g., attracted or repulsed) by an applied magnetic field (e.g., such as ferrous materials, etc.). For instance, a "magnetically sensitive material" includes a metallic material that may be moved (e.g., attracted or repulsed) by a magnetic field generated by a magnet (e.g., electromagnetic, permanent magnet, etc.); however, the term is not limited to metallic materials and is applied to cover all materials that may be moved (e.g., attracted or repulsed) by a magnetic field.

In addition, in some examples, all or some of the electrical contacts 38, 39 on connection plug 32 of electrical power charging assembly 30 as well as all or some of the electrical contacts 58, 59 on connection plug 52 of accessory device 50 may be biased outward so as to facilitate contact with the second electrical contacts 130 of connection port 100 during operations (see e.g., FIGS. 9 and 11). In particular, referring again to FIG. 9, in some examples, all or some of the electrical contacts 38, 39 may be biased outward or away (e.g., normally outward or away) from projected surface 35 on connection plug 32. Additionally, referring again to FIG. 11, in some examples, all of some of the electrical contacts 58, 59 may be biased outward or away (e.g., normally outward or away) from projected surface 57 of connection plug 52. In some examples, the electrical contacts 38, 39 may be biased outward from the projected surface 35, and the electrical contacts 58, 59 may be biased outward from the projected surface 57 via a biasing assembly that is as described above for the biasing assembly 132 shown in FIGS. 6 and 7; however, any suitable mechanism, member, or assembly may be used for biasing the electrical contacts 38, 39, 58, 59, in the manner described above in various examples.

As described above, examples disclosed herein include connection ports (e.g., connection ports 100) that are arranged to connect with, both a USB connection plug (e.g., USB connection plug 80) as well as contact or snap on connection plugs (e.g., connection plugs 32, 52). As a result, through use of the example USB connection ports, an electronic device may accommodate a larger number of potential connection plugs without increasing the total number of available ports disposed along a housing thereof.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A connection port for an electronic device, the connection port comprising:
- a longitudinal axis;
- a receptacle that extends axially with respect to the longitudinal axis;
- a substrate disposed within the receptacle, the substrate comprising an end and a support surface that extends axially with respect to the longitudinal axis;
- a plurality of first electrical contacts on the support surface; and
- a plurality of second electrical contacts on the end, wherein each second electrical contact is electrically coupled to a corresponding one of the first electrical contacts.

2. The connection port of claim 1, comprising a plurality of third electrical contacts on the support surface.

3. The connection port of claim 2, wherein the plurality of first electrical contacts are interspersed between the plurality of third electrical contacts along the support surface.

4. The connection port of claim 1, wherein the plurality of second electrical contacts are biased axially away from the end with respect to the longitudinal axis.

5. The connection port of claim 4, comprising a plurality of biasing assemblies disposed within the substrate to axially bias the plurality of second electrical contacts away from the end.

6. The connection port of claim 5, wherein each second electrical contact is formed as a single-piece monolithic body with the corresponding one of the first electrical contacts.

7. An electronic device, comprising:
- a housing;
- a connection port coupled to the housing, wherein the connection port comprises:
  - a longitudinal axis;
  - a receptacle that extends axially with respect to the longitudinal axis;
  - a dielectric substrate disposed within the receptacle, the substrate comprising an end and a support surface that extends axially with respect to the longitudinal axis;
  - a plurality of first electrical contacts on the support surface;
  - a plurality of second electrical contacts on the end, wherein each second electrical contact is electrically coupled to a corresponding one of the first electrical contacts; and a plurality of third electrical contacts on the support surface;

an electrical power source disposed within the housing, wherein the plurality of first electrical contacts are to be electrically coupled to the electrical power source; and a processor disposed within the housing, wherein the plurality of third electrical contacts are to be electrically coupled to the processor.

8. The electronic device of claim 7, wherein the plurality of first electrical contacts are interspersed between the plurality of third electrical contacts along the support surface.

9. The electronic device of claim 7, wherein the plurality of second electrical contacts are biased axially away from the end with respect to the longitudinal axis.

10. The electronic device of claim 9, comprising a plurality of biasing assemblies disposed within the substrate to axially bias the plurality of second electrical contacts away from the end.

11. The electronic device of claim 10, wherein the biasing assemblies are electrically conductive.

12. The electronic device of claim 7, comprising a magnet coupled to the housing, adjacent to the connection port.

13. A system, comprising:

a first device comprising a universal serial bus (USB) connection port, comprising:

a longitudinal axis;

a receptacle that extends axially with respect to the longitudinal axis;

a substrate disposed within the receptacle, the substrate comprising an end and a support surface that extends axially with respect to the longitudinal axis;

a plurality of first electrical contacts on the support surface; and a plurality of second electrical contacts on the end, wherein each second electrical contact is electrically coupled to a corresponding one of the first electrical contacts; and a second device comprising a connection plug that includes a plurality of third electrical contacts, wherein the plurality of third electrical contacts are to engage with the plurality of second electrical contacts when the connection plug is connected to the USB connection port.

14. The system of claim 13, comprising:

a first magnet disposed in one of the first device; and a magnet disposed in the connection plug of the second device, wherein the first magnet is to attract the second magnet when the connection plug is connected to the USB connection port.

15. The system of claim 13, wherein the second device comprises a switch assembly comprising a switch and a magnet, wherein the magnet is to attract the connection plug toward the switch.

* * * * *